US007726286B2

(12) United States Patent
Prior, II et al.

(10) Patent No.: US 7,726,286 B2
(45) Date of Patent: Jun. 1, 2010

(54) HOUSING FOR A SUPERCHARGER ASSEMBLY

(75) Inventors: Gregory P. Prior, II, Birmingham, MI (US); Roxann M. Bittner, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 357 days.

(21) Appl. No.: 11/751,194

(22) Filed: May 21, 2007

(65) Prior Publication Data

US 2008/0292452 A1 Nov. 27, 2008

(51) Int. Cl.
*F02B 33/38* (2006.01)
*B23P 15/00* (2006.01)
*F04D 29/18* (2006.01)
*F01D 11/12* (2006.01)

(52) U.S. Cl. ................. 123/559.1; 29/888.02; 418/178; 418/179; 415/9; 415/173.4; 415/174.4

(58) Field of Classification Search .............. 123/559.1; 29/888.02, 888.3; 418/178, 179, 205, 206.6, 418/206.9; 415/173.4, 9, 174.4
See application file for complete search history.

(56) References Cited

U.S. PATENT DOCUMENTS 2,754,050 A * 7/1956 Wellington ................. 418/178
3,346,175 A * 10/1967 Wiles ...................... 415/173.4
4,094,673 A * 6/1978 Erickson et al. .......... 415/174.4
4,466,785 A * 8/1984 Biswas ........................ 418/178
4,536,127 A * 8/1985 Rossmann et al. ....... 415/173.4
5,554,020 A * 9/1996 Rao et al. .................... 418/178
6,358,002 B1 * 3/2002 Good et al. .............. 415/174.4
6,397,462 B1 * 6/2002 Lanteigne et al. ........ 29/888.02
6,688,867 B2 * 2/2004 Suman et al. ............... 418/178
6,971,632 B2 * 12/2005 Elliot et al. ................. 251/305
2001/0055652 A1 * 12/2001 Dalzell et al. ............... 427/447
2004/0045291 A1 * 3/2004 Meheen ...................... 60/605.1
2004/0223847 A1 * 11/2004 Cvjeticanin et al. ......... 415/206

FOREIGN PATENT DOCUMENTS

CN 1615184 A 5/2005

* cited by examiner

*Primary Examiner*—Thomas E Denion
*Assistant Examiner*—Mary A Davis

(57) ABSTRACT

A housing for a supercharger assembly is provided having an inner wall at least partially defining a rotor cavity. A layer is formed from a sacrificial polymeric material and is provided on at least a portion of the inner wall. The layer is operable to provide approximately zero running clearance and improve scuff resistance between the first and second rotors and the inner wall. The sacrificial polymeric material is applied to the inner wall by insert molding to form the layer. A method of forming the housing is also provided.

14 Claims, 3 Drawing Sheets

HOUSING FOR A SUPERCHARGER ASSEMBLY

TECHNICAL FIELD

The present invention relates to a housing for a supercharger assembly.

BACKGROUND OF THE INVENTION

Roots-type and screw-type positive displacement compressors are employed in industrial and automotive applications. The compressor or supercharger may be operatively connected to an internal combustion engine to increase the amount or volume of intake air communicated to the internal combustion engine thereby increasing the volumetric efficiency of the internal combustion engine. The supercharger typically includes two interleaved counter-rotating rotors, each of which may be formed with a plurality of lobes operable to convey volumes of intake air from an inlet passage to an outlet passage for subsequent introduction to the internal combustion engine. The efficiency of the supercharger is dependent on the running clearances between the two rotors and between each of the two rotors and a housing within which the two rotors are rotatably supported.

SUMMARY OF THE INVENTION

A housing for a supercharger is provided having an inner wall at least partially defining a rotor cavity. A layer is formed from a sacrificial polymeric material and is provided on at least a portion of the inner wall. The sacrificial polymeric material may be a thermoplastic, such as nylon. The layer is operable to provide approximately zero running clearance and improve scuff resistance between the first and second rotors and the inner wall. The sacrificial polymeric material is applied to the inner wall by insert molding to form the layer. A supercharger assembly incorporating the housing is also disclosed.

A method of forming a housing for a supercharger assembly is also provided. The housing includes a rotor bore defined by an inner wall and configured to rotatably receive a first and second rotor. The method includes forming a layer of a sacrificial polymeric material on at least a portion of the inner wall by insert molding such that the running clearance between the first and second rotors and the inner wall is approximately zero.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
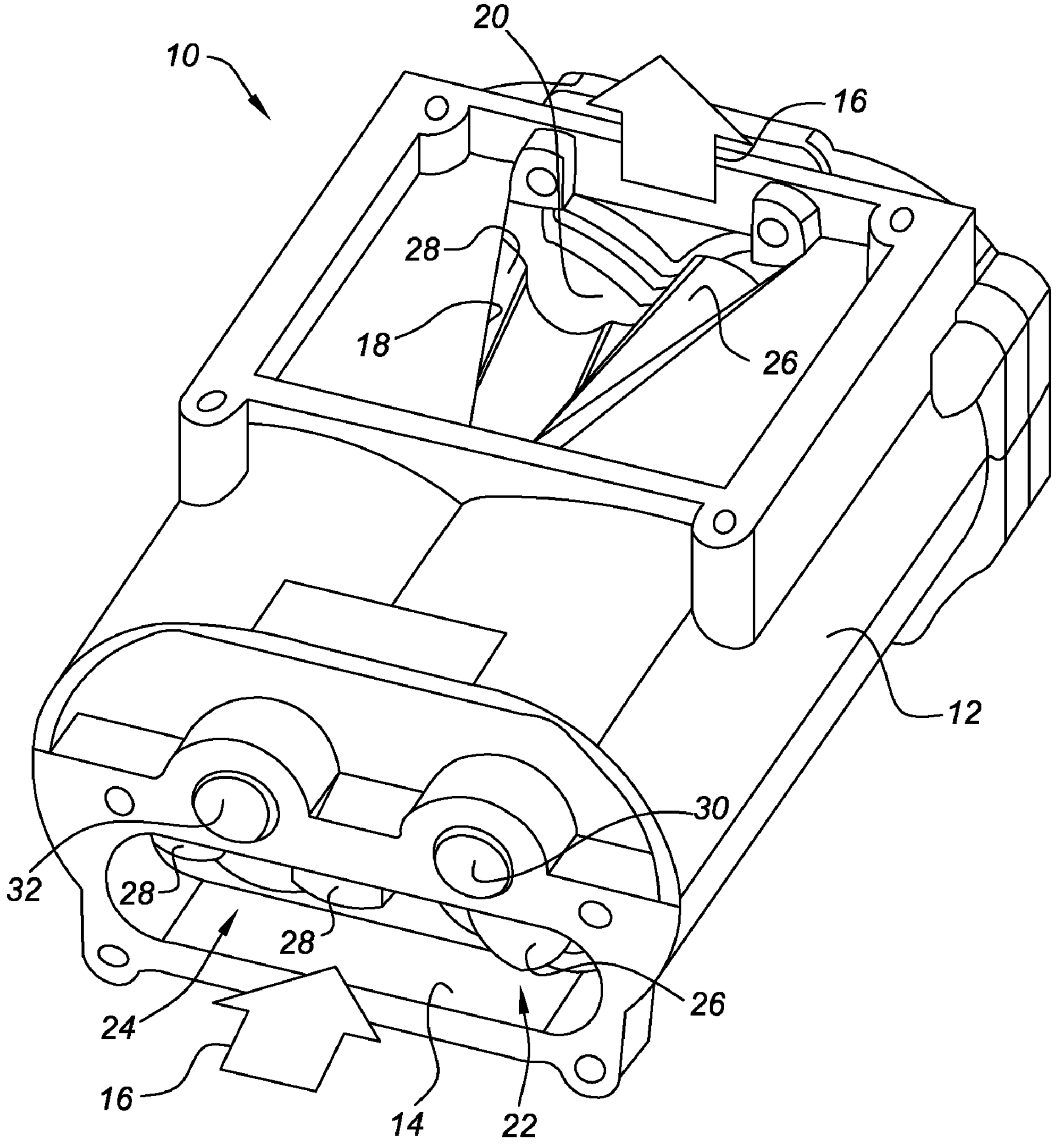
FIG. 1 is a schematic perspective view of a supercharger assembly configured for use with an internal combustion engine.

Referring to the drawings wherein like reference numbers correspond to like or similar components throughout the several figures, there is shown in FIG. 1 a compressor or supercharger assembly, generally indicated at 10. The supercharger assembly 10 includes a housing 12. The housing 12 defines an inlet passage 14 configured to induct intake air, represented as arrow 16, into the supercharger assembly 10. The housing 12 further defines an outlet passage 18 configured to exhaust the intake air 16 from the supercharger assembly 10.

A rotor cavity 20 is defined by the housing 12 and is configured to contain a first and second rotor assembly 22 and 24, respectively, rotatably disposed therein. The first and second rotor assemblies 22 and 24 are interleaved and counter-rotating with respect to each other. The first rotor assembly 22 includes a plurality of lobes 26 extending radially outward in a clockwise twisting helical shape, as viewed from the inlet passage 14, while the second rotor assembly 24 includes a plurality of lobes 28 extending radially outward in a counter-clockwise twisting helical shape, as viewed from the inlet passage 14. The first and second rotor assemblies 22 and 24 cooperate to convey volumes of intake air 16 from the inlet passage 14 to the outlet passage 18. The first and second rotor assemblies 22 and 24 are rotatably supported within the rotor cavity 20 by a respective first and second shaft member 30 and 32.

During operation of the supercharger assembly 10, the first and second rotor assemblies 22 and 24 cooperate to convey volumes of intake air 16 from the inlet passage 14 to the outlet passage 18. The temperature of the intake air 16 tends to increase as the intake air 16 is transferred from the inlet passage 14 to the outlet passage 18, thereby forming a thermal gradient along the longitudinal axis of the first and second rotors 22 and 24. As a result, the degree of thermal expansion of the first and second rotor assemblies 22 and 24 will increase during operation of the supercharger assembly 10, thereby increasing the likelihood of "scuff". Scuff is defined as metal transfer as a result of the first and second rotor assemblies 22 and 24 contacting one another or the housing 12. Scuff occurs when the running clearances, i.e. the clearance dimension between the lobes 26 and 28 and the housing 12 when the supercharger assembly 10 is operating, reaches zero causing an interference condition and material transfer between the first and second rotor assemblies 22 and 24 and the housing 12.

Figure 2:
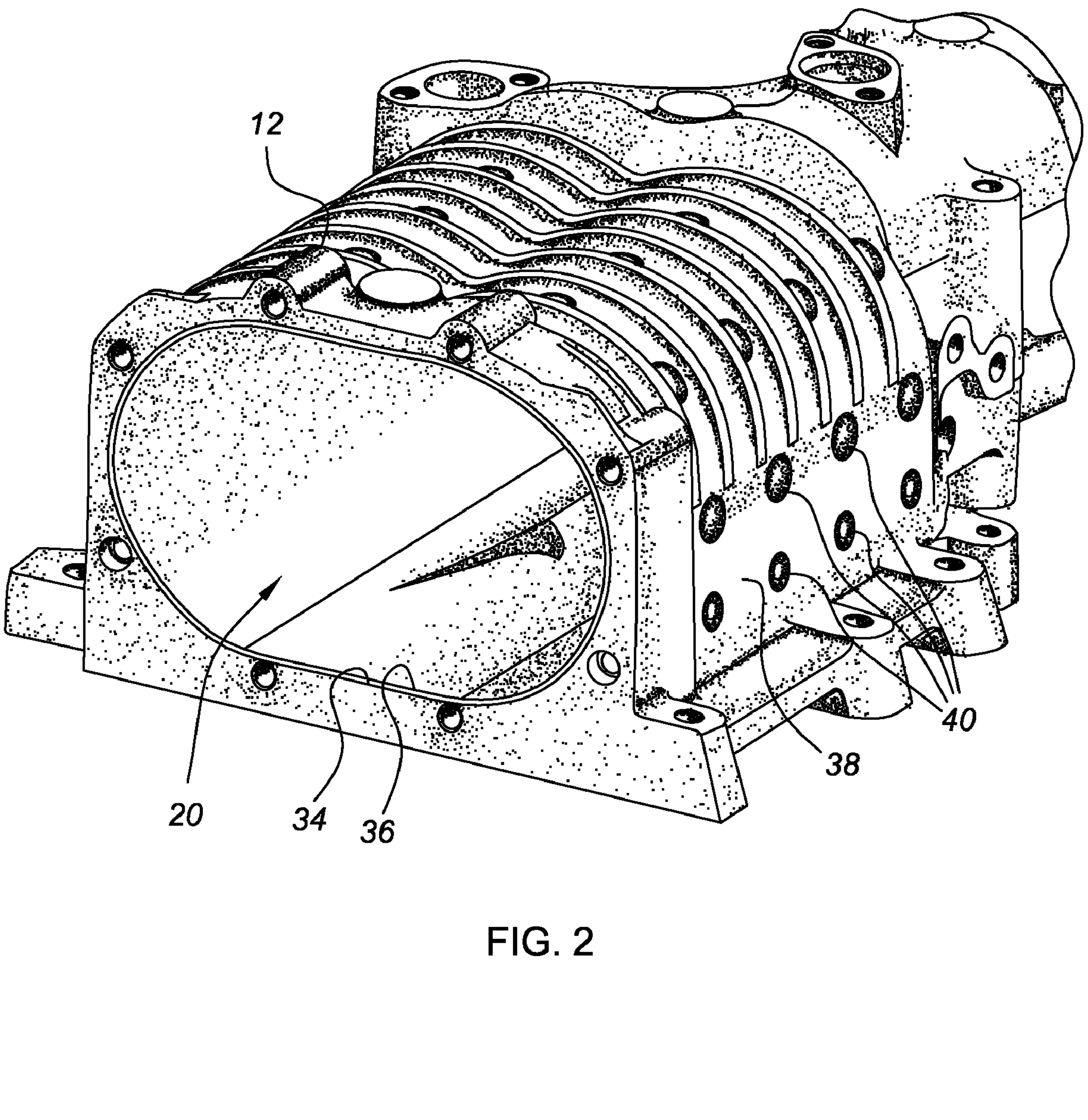
FIG. 2 is a perspective view of a housing for a supercharger assembly consistent with the preferred embodiment.

Referring to FIG. 2 and with continued reference to FIG. 1, a perspective view of the housing 12, consistent with the preferred embodiment is shown. The housing 12 is preferably cast from a metal such as aluminum or magnesium. The rotor cavity 20 is defined by an inner wall 34. The inner wall 34 has a layer 36 of a sacrificial polymeric material thereon, that is a portion of the layer 36 may be worn away by the lobes 26 and 28 of the first and second rotor assemblies 22 and 24. In a preferred embodiment the sacrificial polymeric material is a thermoplastic polymer such as Nylon. Due to the fact that a portion of the layer 36 may be worn away during operation of the supercharger assembly 10, the layer 36 is operable to provide approximately zero running clearance and improve scuff resistance between the first and second rotor assemblies 22 and 24 and the inner wall 34, thereby increasing the operating efficiency of the supercharger assembly 10. The layer 36 preferably has a thickness between approximately 0.05 and approximately 0.15 millimeters. The method of forming the layer 36 is described in greater detail hereinbelow with reference to FIGS. 3 through 5. The housing 12 further includes an outside wall 38 opposite the inner wall 34. A plurality of anchor members 40 engage with the outer wall 38 and operate to retain the layer 36 against the inner wall 34 of the housing 12.

Figure 3:
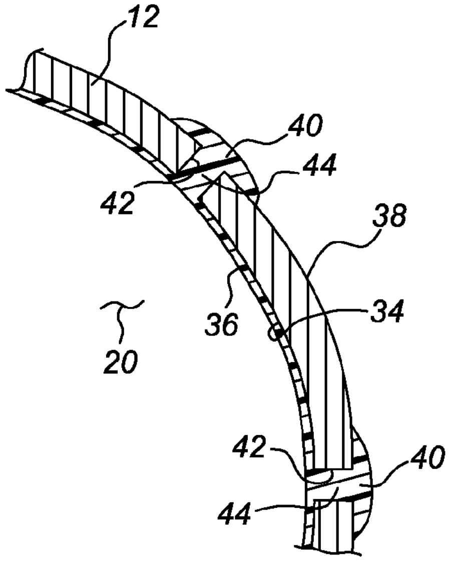
FIG. 3 is a cross sectional view of a portion of the housing of FIG. 2 illustrating a layer formed from a sacrificial polymeric material.

Referring to FIG. 3, there is shown a cross sectional view of a portion of the housing 12 of FIG. 2. The housing 12 defines a plurality of holes 42. Each of the holes 42 contain a key 44 formed from the sacrificial polymeric material each of which interconnect the layer 36 with the anchor members 40 thereby retaining the layer 36 with respect to the inner wall 34. The layer 36, keys 44, and anchor members 40 are preferably integrally formed by an insert molding method as discussed hereinbelow.

Figure 4:
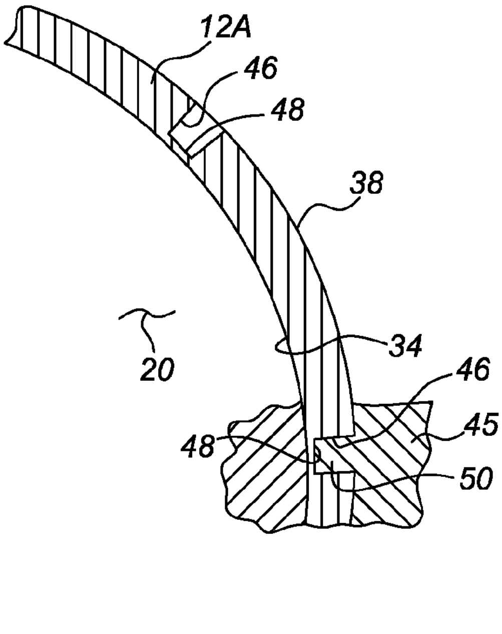
FIG. 4 is a cross sectional view of a portion of the housing of FIGS. 2 and 3 illustrating a method of forming the housing.

A method of forming the housing 12 having the layer 36 contained therein can best be described with reference to FIGS. 3 through 5. Referring to FIG. 4, a housing 12A is shown in an "as cast" state. That is, the housing 12A is formed by pouring molten metal into a mold 45, a portion of which is shown in FIG. 4. The molten metal is allowed to cool and the mold 45 is removed thereby forming the housing 12A. Such casting operations are known to those skilled in the art and will not be discussed in detail; however, the housing 12 may be formed by die casting, sand casting, semi-permanent mold casting or other types of casting. A plurality of blind cavities 46 are defined by the housing 12A. The blind cavities 46 are closed at one end by portions 48 of the inner wall 34. The cavities 46 are preferably formed during casting of the housing 12A by providing a plurality of pins 50, one of which is shown in FIG. 4, within the mold 45. The inner wall 34 of housing 12A is machined, such as by a boring operation, to form the housing 12 of FIGS. 3 and 5. During the machining operation, an amount of material is removed from the inner wall 34 thereby removing the portions 48 of the inner wall 34 to form the holes 42, shown in FIGS. 3 and 5, which extend between the outer wall 38 and the inner wall 34.

Figure 5:
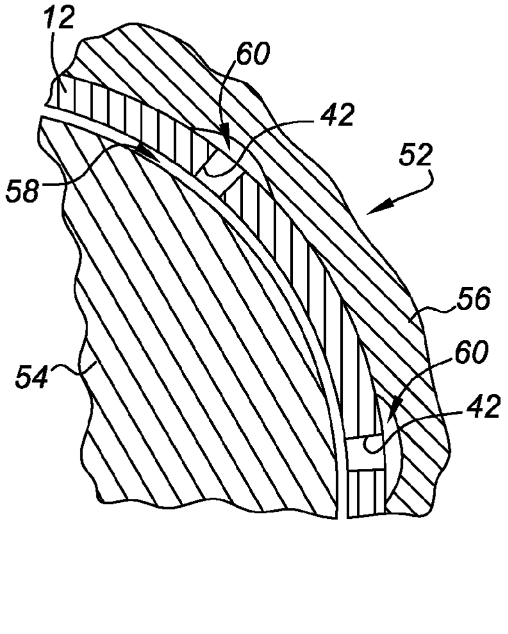
FIG. 5 is a cross sectional view of a portion of the housing of FIGS. 2 through 4 illustrating a method of insert molding the layer formed from a sacrificial polymeric material.

Referring now to FIG. 5, there is shown the housing 12 positioned within a mold 52, a portion of which is shown in FIG. 5. The mold 52 includes a first part 54 and a second part 56. The first part 54 cooperates with the housing 12 to define a volume 58, while the second part 56 cooperates with the housing 12 to form volumes 60. The sacrificial polymeric material is subsequently introduced into the volume 58 and allowed to flow through the holes 42 into the volumes 60. The sacrificial polymeric material is allowed to set and the first and second parts 54 and 56 of the mold 52 are removed, as shown in FIG. 3. Alternatively, the sacrificial polymeric material may be introduced into the volumes 60 and allowed to flow through holes 42 into the volume 58. Referring to FIG. 3, this insert molding operation allows the layer 36, keys 44, and anchor members 40 to be formed integrally. The layer 36 may be left as formed or may be finish machined to receive the first and second rotor assemblies 22 and 24.

In operation, with reference to FIGS. 1 through 3, the first and second rotor assemblies will expand as a result of heat transfer between the intake air 16, friction, and other energy sources, such as heat energy radiating from the internal combustion engine. As the first and second rotors 22 and 24 expand, the running clearances between the lobes 26 and 28 and the inner wall 34 will decrease. By providing the layer 36 of sacrificial polymeric material on the inner wall 34 the running clearances between the lobes 26 and 28 with respect to the housing 12 may be reduced to approximately zero with a reduced likelihood of scuffing.

While the best modes for carrying out the invention have been described in detail, those familiar with the art to which this invention relates will recognize various alternative designs and embodiments for practicing the invention within the scope of the appended claims.

The invention claimed is:

1. A supercharger housing apparatus defining a rotor cavity configured to receive first and second rotors, the housing apparatus comprising:

a housing member having an inner wall at least partially defining the rotor cavity; and a layer formed from a sacrificial polymeric material provided on at least a portion of said inner wall and operable to provide approximately zero running clearance to thereby improve scuff resistance between the first and second rotors and said inner wall;

wherein said housing member includes an outer wall opposite said inner wall and wherein at least one hole extends from said inner wall to said outer wall; and wherein said sacrificial polymeric material fills at least a portion of said at least one hole to form a key on said outer wall operable to retain said layer with respect to said inner wall.

2. The supercharger housing apparatus of claim 1, wherein said sacrificial polymeric material is applied to said inner wall by insert molding to form said layer.

3. The supercharger housing apparatus of claim 1, wherein said sacrificial polymeric material is nylon.

4. The supercharger housing apparatus of claim 1, wherein said layer is approximately 0.05 to approximately 0.15 millimeters in thickness.

5. The supercharger housing apparatus of claim 1, wherein said sacrificial polymeric material is a thermoplastic material.

6. The supercharger housing apparatus of claim 1, further comprising an anchor member engaged with said outer wall and formed integrally with said key and operable to retain said key within said at least one hole.

7. The supercharger housing apparatus of claim 1, wherein said housing member is cast from metal.

8. A supercharger assembly comprising:

a housing defining a rotor cavity and having an inner wall and an outer wall and includes at least one hole extending from said inner wall to said outer wall;

wherein said inner wall defines said rotor cavity;

first and second rotors rotatably disposed within said rotor cavity;

a layer formed from a sacrificial polymeric material provided on at least a portion of said inner wall and operable to provide approximately zero running clearance to thereby improve scuff resistance between the first and second rotors and said inner wall;

wherein said layer is formed by insert molding; wherein said sacrificial polymeric material fills at least a portion of said at least one hole to form a key on said outer wall operable to retain said layer with respect to said inner wall.

9. The supercharger assembly of claim 8, wherein said sacrificial polymeric material is nylon.

10. The supercharger assembly of claim 8, wherein said layer is 0.05 to 0.15 millimeters in thickness.

11. The supercharger assembly of claim 8, wherein said sacrificial polymeric material is a thermoplastic material.

12. The supercharger assembly of claim 8, further comprising an anchor member engaged with said outer wall and formed integrally with said key and operable to retain said key within said at least one hole.

13. A method of forming a housing for a supercharger assembly having a rotor bore defined by an inner wall and configured to rotatably receive a first and second rotor, the method comprising:

forming a layer of a sacrificial polymeric material on at least a portion of the inner wall by insert molding such that the running clearances between said first and second rotors and said inner wall is approximately zero;

forming at least one hole within said housing member extending from said inner wall to an opposed outer wall; and allowing a portion of said sacrificial polymeric material to flow through said at least one hole during forming said layer to form a key having an integrally formed anchor member engaged with said outer wall operable to retain said key within said at least one hole, said key being operable to retain said layer with respect to said inner wall.

14. The method of forming a housing of claim 13, further comprising:

casting said housing member from metal, said housing having an outer wall opposite said inner wall;

forming at least one blind cavity on said outer wall during said casting, wherein one end of said at least one blind cavity is blocked by a portion of said inner wall; and machining said inner wall to remove said portion such that said at least one blind cavity is opened to said inner wall to form said at least one hole.

* * * * *